H. ABERNETHY.
HAY OR STEVEDORE'S HOOK.
APPLICATION FILED MAR. 5, 1909.
950,687.
Patented Mar. 1, 1910.
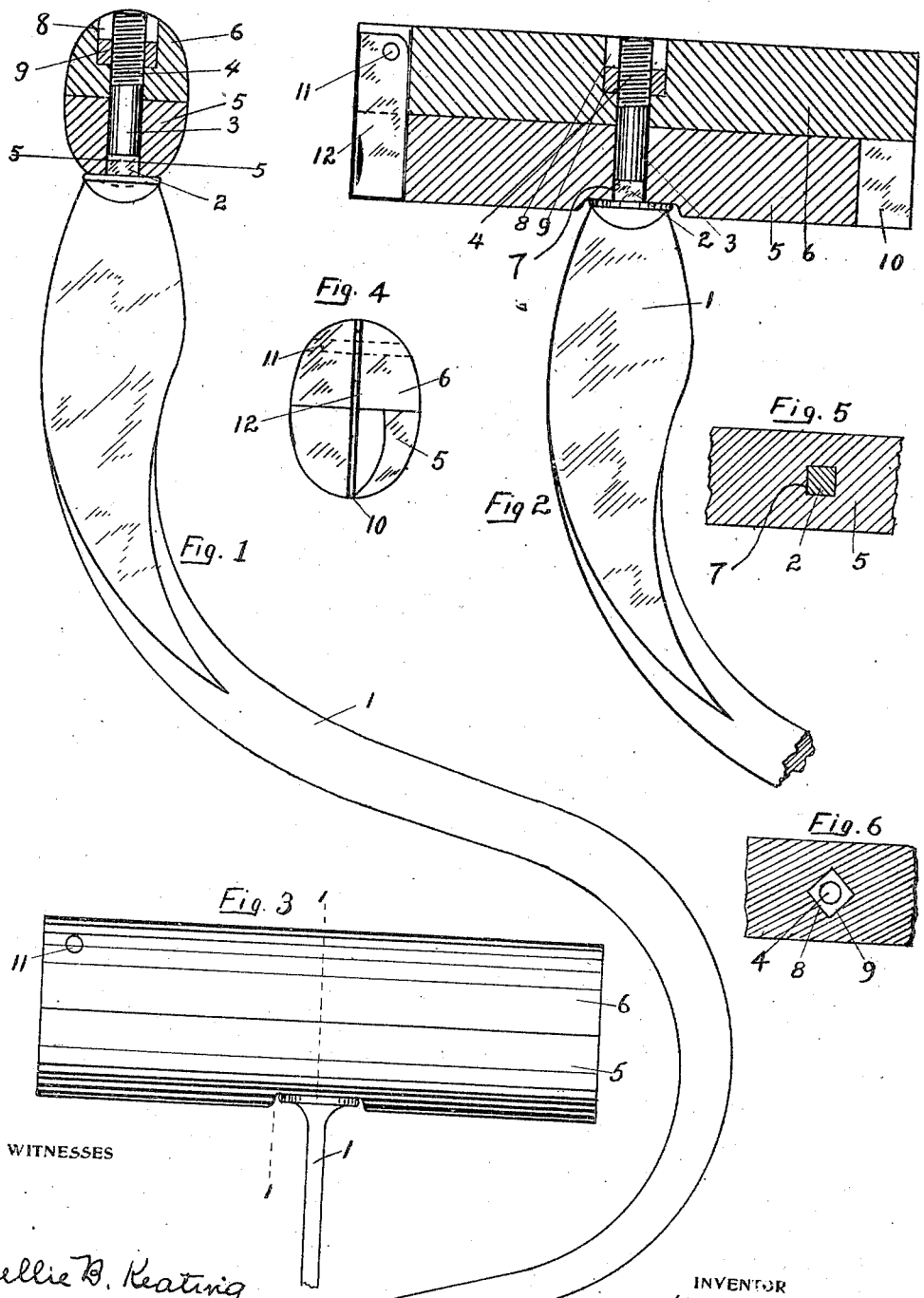

UNITED STATES PATENT OFFICE.

HENRY ABERNETHY, OF BERKELEY, CALIFORNIA.

HAY OR STEVEDORE'S HOOK.

950,687.  Specification of Letters Patent.  Patented Mar. 1, 1910.

Application filed March 5, 1909. Serial No. 481,419.

*To all whom it may concern:*

Be it known that I, HENRY ABERNETHY, a citizen of the United States, residing at Berkeley, in the county of Alameda and State of California, have invented new and useful Improvements in Hay or Stevedores' Hooks, of which the following is a specification.

The present invention relates to improvements in hooks, variously known as hay hooks, stevedores' hooks, or longshoremen's hooks, used for moving bales, boxes, and other heavy articles. On account of their handles extending crosswise of the plane of the hook, these hooks are inconvenient to carry when not in use.

The object of the present improvement is to obviate the above inconvenience.

In the accompanying drawing, Figure 1, is a cross section of my improved hook taken on the line 1—1 of Fig. 3; Fig. 2 is a section taken longitudinally through the handle of the hook when it is in position ready for carrying; Fig. 3 is a broken side view of the hook when in the position ready for use; Fig. 4 is an end view of the handle; Fig. 5 is a section through the handle on the line 5—5 of Fig. 1; Fig. 6 is a broken top view of the handle.

Referring to the drawing, 1 indicates the hook proper, which is formed with a stem, the inner part 2 of which is square, the stem extending from the square portion 2 in a rounded portion 3, and terminating in a threaded portion 4. The handle is made in two sections, a lower section 5 and an upper section 6. Each handle section is flat on the side adjacent to the other section, and half round upon the outer side, so that the two half sections form a handle of the usual shape. The lower section 5 has a square socket 7 clearly shown in Fig. 5, the lower part of which is adapted to fit upon the square portion 2 of the stem of the hook. The upper section 6 has a square socket 8, in which if the handle is made of wood, fits snugly a square nut 9, (see Fig. 6) which can screw upon the threaded portion 4 of the stem. If the handle is made of metal the nut 9 will not be needed, as the screw will be tapped into the metal itself. The lower section of the handle has at each end a slit or notch 10, and the upper section has pivoted in one end, as shown at 11 a blade-like latch 12, adapted to enter either of said slits or notches 10.

When in use, the handle is disposed crosswise of the plane of the hook, in the ordinary manner. But for convenience of transportation when not in use, the latch 12 is raised so as to disconnect the two handle sections, and the upper section is then screwed outward upon the threaded stem, so as to raise it from the lower stem a sufficient distance to permit the lower section to be raised to such a height that the square socket 7 therein leaves the square portion 2 of the stem of the hook, whereupon the lower section can likewise be turned. Said lower section is then turned through a right angle into the plane of the hook, as shown in Fig. 2, and is allowed to drop so that the square socket 7 again engages the square portion 2 of the stem. The upper section is now screwed back again upon the lower section, and when screwed sufficiently tight and the two sections register with each other, the latch 12 is dropped into position in one of the slits 10, thereby firmly connecting the two handle sections.

On referring to Figs. 1 and 2 it will be seen that the threaded part 4 extends beyond the internally threaded part 9 a greater distance than the length of the angular socket 7. This permits of the end of the threaded part 4 to be swaged down, so that the outer section cannot be unscrewed from off the stem, and none of the parts can be detached from one another and be dropped or become lost, while at the same time permitting the angular part 2 of the stem to be withdrawn from the angular socket 7 a sufficient distance to permit the hook to be turned at a right angle relatively to the handle. When the parts are detachable from each other, some of them are, sooner or later, very liable to be dropped and lost. Also when a detached part has to be screwed on to another, especially by a person inexperienced in the use of such tools, there is great liability of the thread being stripped. By the above construction, which permits the outer end of the stem to be swaged, the one section can never be completely withdrawn from the other.

I claim:—

A hook having a stem, and a handle for said hook formed in two sections, the stem having an inner angular part and an outer threaded part, the inner section having an angular socket fitting snugly on said angular part, and the outer section having an internally threaded part adapted to be screwed upon said threaded outer part of the stem, the outer end of the stem extending beyond said internally threaded part of the outer section a greater distance than the length of the angular socket in the inner section, and
5 means for securing said sections in register with each other, substantially as described.

In testimony whereof I have hereunto set my hand in the presence of two subscribing witnesses.

HENRY ABERNETHY.

Witnesses:
  D. G. McIvor,
  Wm. F. Lorenz.